(12) United States Patent
Yanazawa et al.

(10) Patent No.: US 10,938,197 B2
(45) Date of Patent: Mar. 2, 2021

(54) GROMMET AND GROMMET ASSEMBLING METHOD

(71) Applicant: Yazaki Corporation, Tokyo (JP)

(72) Inventors: Kenta Yanazawa, Shizuoka (JP);
Hideomi Adachi, Shizuoka (JP);
Masahide Tsuru, Shizuoka (JP);
Hiroyuki Yoshida, Shizuoka (JP);
Toshihiro Nagashima, Shizuoka (JP);
Takeshi Ogue, Shizuoka (JP); Tetsuo Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 144 days.

(21) Appl. No.: 16/167,795

(22) Filed: Oct. 23, 2018

(65) Prior Publication Data
US 2019/0131783 A1    May 2, 2019

(30) Foreign Application Priority Data
Oct. 26, 2017  (JP) .................................. 2017-206897

(51) Int. Cl.
| H02G 15/013 | (2006.01) |
| B60R 16/02 | (2006.01) |
| H02G 3/22 | (2006.01) |
| H01B 7/282 | (2006.01) |
| H02G 3/08 | (2006.01) |

(52) U.S. Cl.
CPC ....... *H02G 15/013* (2013.01); *B60R 16/0222* (2013.01); *H02G 3/22* (2013.01); *H01B 7/282* (2013.01); *H02G 3/083* (2013.01)

(58) Field of Classification Search
None
See application file for complete search history.

(56) References Cited

U.S. PATENT DOCUMENTS

| 2,700,752 A * | 1/1955 | Cataldo .................. E01F 9/559 |
| | | 439/650 |
| 2,996,567 A * | 8/1961 | Channell .............. H02G 15/013 |
| | | 174/92 |

(Continued)

FOREIGN PATENT DOCUMENTS

| CN | 104885309 A | 9/2015 |
| CN | 106716759 A | 5/2017 |

(Continued)

*Primary Examiner* — Jenny L Wagner
*Assistant Examiner* — Muhammed Azam
(74) *Attorney, Agent, or Firm* — Sughrue Mion, PLLC

(57) ABSTRACT

Provided is a grommet having: a main body, which is arranged in close contact with an opening of an attachment member, through which a shield electric wire having an electric wire covered with a braid is inserted, and which includes an elastically deformable electrically conductive material; a pair of shield terminals that are arranged respectively on one side and the other side of the attachment member, are connected with end portions of the braid, are assembled with the main body, and include an electrically conductive material; and an insertion portion, which is formed of a member continuous with the main body, through which the electric wire exposed from the braid is inserted, and which comes into close contact with the outer circumference of the electric wire.

4 Claims, 3 Drawing Sheets

(56) References Cited

U.S. PATENT DOCUMENTS

| | | | | |
|---|---|---|---|---|
| 3,447,986 A * | 6/1969 | Kasahara | ............. | H02G 15/013 156/49 |
| 3,555,171 A * | 1/1971 | Larson | ................. | H01R 4/206 174/138 F |
| 4,341,922 A * | 7/1982 | Bossard | .............. | H02G 15/007 174/135 |
| 4,692,561 A * | 9/1987 | Nattel | ................. | H02G 15/013 174/653 |
| 4,692,562 A * | 9/1987 | Nattel | ................. | H02G 15/013 174/653 |
| 4,821,368 A * | 4/1989 | Albrecht | ................. | F16F 1/422 16/2.5 |
| 4,928,349 A * | 5/1990 | Oikawa | ..................... | F16L 5/02 16/2.1 |
| 4,959,509 A * | 9/1990 | Takeuchi | ..................... | H02G 3/083 174/153 G |
| 5,113,038 A * | 5/1992 | Dehling | ............... | G02B 6/4445 174/77 R |
| 5,220,132 A * | 6/1993 | Macey | ................. | H02G 15/013 174/658 |
| 5,288,947 A * | 2/1994 | Stewing | ............... | H02G 15/013 174/92 |
| 5,952,612 A * | 9/1999 | Winfield | .............. | H02G 15/103 174/74 R |
| 6,081,964 A * | 7/2000 | Mori | ................... | B60R 16/0222 16/2.2 |
| 6,438,828 B1 * | 8/2002 | Uchiyama | .............. | H02G 3/088 174/152 G |
| 7,244,895 B1 * | 7/2007 | Borzabadi | ........... | B60R 16/0222 174/650 |
| 9,793,692 B1 * | 10/2017 | Pogash | ................ | H01B 7/0216 |
| 10,483,687 B2 * | 11/2019 | Yamashita | ............. | H02G 3/086 |
| 2002/0004967 A1 * | 1/2002 | Saeki | ................. | B60R 16/0222 16/2.1 |
| 2003/0226234 A1 * | 12/2003 | Katayama | ................. | H02G 3/22 16/2.1 |
| 2004/0060723 A1 * | 4/2004 | Pallapothu | .......... | B60R 16/0222 174/653 |
| 2004/0140118 A1 * | 7/2004 | Nishimoto | .......... | B60R 16/0222 174/650 |
| 2006/0003629 A1 * | 1/2006 | Murphy | ................. | H01R 24/40 439/578 |
| 2010/0300749 A1 * | 12/2010 | Adachi | ..................... | H02G 3/22 174/84 C |
| 2011/0265286 A1 * | 11/2011 | Paku | ................... | B60R 16/0222 16/2.2 |
| 2012/0061369 A1 * | 3/2012 | Gu | ....................... | G05D 23/1928 219/209 |
| 2012/0217041 A1 * | 8/2012 | Agusa | ...................... | F16J 15/52 174/153 G |
| 2015/0060134 A1 * | 3/2015 | Minami | ................. | H01B 7/282 174/72 A |
| 2015/0295363 A1 * | 10/2015 | Wang | ................. | H01R 13/5221 439/578 |
| 2015/0318679 A1 * | 11/2015 | Nakai | ................ | H01R 13/5219 16/2.2 |
| 2016/0141853 A1 * | 5/2016 | Findley | ................ | H02G 15/007 174/653 |
| 2016/0189828 A1 * | 6/2016 | Oga | ....................... | H01B 7/282 174/72 A |
| 2016/0226234 A1 * | 8/2016 | Yoshida | ................ | H02G 15/013 |
| 2017/0179703 A1 * | 6/2017 | Kominato | ................ | H02G 3/22 |
| 2017/0349123 A1 * | 12/2017 | Katoh | ................ | B60R 16/0222 |
| 2018/0248306 A1 * | 8/2018 | Franke | .................... | H01R 13/59 |
| 2019/0115122 A1 * | 4/2019 | Yamada | ................ | H01B 17/583 |
| 2019/0131783 A1 * | 5/2019 | Yanazawa | ........... | H02G 15/013 |

FOREIGN PATENT DOCUMENTS

| | | | | |
|---|---|---|---|---|
| DE | | 2553755 A1 * | 6/1977 | .......... H02G 15/113 |
| JP | | 2016-119821 A | 6/2016 | |
| JP | | 2016-187294 A1 * | 10/2016 | ............... H02G 3/22 |

* cited by examiner

GROMMET AND GROMMET ASSEMBLING METHOD

CROSS REFERENCE TO RELATED APPLICATIONS

The present application claims priority to Japanese Patent Application No. 2017-206897 filed on Oct. 26, 2017, the entire contents of which are incorporated by reference herein.

BACKGROUND

Technical Field

The present invention relates to a grommet and a grommet assembling method. More specifically, the present invention relates to a grommet through which a shield electric wire having an electric wire covered with a braid is inserted, and a grommet assembling method.

Related Art

Conventionally, there is a known grommet, which is arranged in close contact with an opening of an attachment member, through which a shield electric wire having an electric wire covered with a braid is inserted, and which is provided with a water cut-off grommet as an elastically deformable main body (see, for example, JP 2016-119821 A).

Such a grommet is provided with: a water cut-off valve that is assembled in close contact between the electric wire and the braid; a water cut-off adhesive member that fills stitches of the braid: and an elastic close contact portion that is provided at the water cut-off grommet and comes into close contact with the water cut-off adhesive member.

In such a grommet, since the water cut-off valve and the water cut-off adhesive member are arranged at a portion where the elastic close contact portion of the water cut-off grommet is located, no gap is formed, and water cut-off performance can be retained even when the shield electric wire having an electric wire covered with the braid is inserted.

SUMMARY

However, in a grommet such as the grommet disclosed in JP 2016-119821 A, there are a large number of operation processes including an operation of inserting an electric wire through a water cut-off valve, an operation of arranging a braid on an outer circumference of the water cut-off valve, an operation of arranging a water cut-off adhesive member on the outer circumference of the braid, an operation of melting and solidifying the water cut-off adhesive member, and an operation of arranging the solidified water cut-off adhesive member at an elastic close contact portion, and assemblability is lowered.

Therefore, an object of the present invention is to provide a grommet and a grommet assembling method capable of improving the assemblability.

A first aspect of the present invention is a grommet having: a main body, which is arranged in close contact with an opening of an attachment member, through which a shield electric wire having an electric wire covered with a braid is inserted, and which includes an elastically deformable electrically conductive material; a pair of shield terminals that are arranged respectively on one side and the other side of the attachment member, are connected with end portions of the braid, are assembled with the main body, and include an electrically conductive material; and an insertion portion, which is formed of a member continuous with the main body, through which the electric wire exposed from the braid is inserted, and which comes into close contact with an outer circumference of the electric wire.

A second aspect of the present invention is a grommet assembling method including: inserting an electric wire through an insertion portion, which includes an elastically deformable electrically conductive material and is provided at a main body, such that an outer circumference of the electric wire comes into close contact with the insertion portion; connecting end portions of a braid with a pair of shield terminals that are arranged on one side and the other side of the main body and include an electrically conductive material; and bringing the pair of shield terminals close to the main body such that the braid covers the outer circumference of the electric wire and assembling the pair of shield terminals with the main body.

With the present invention, it is possible to provide a grommet and a grommet assembling method capable of improving assemblability.

DETAILED DESCRIPTION

Figure 1:
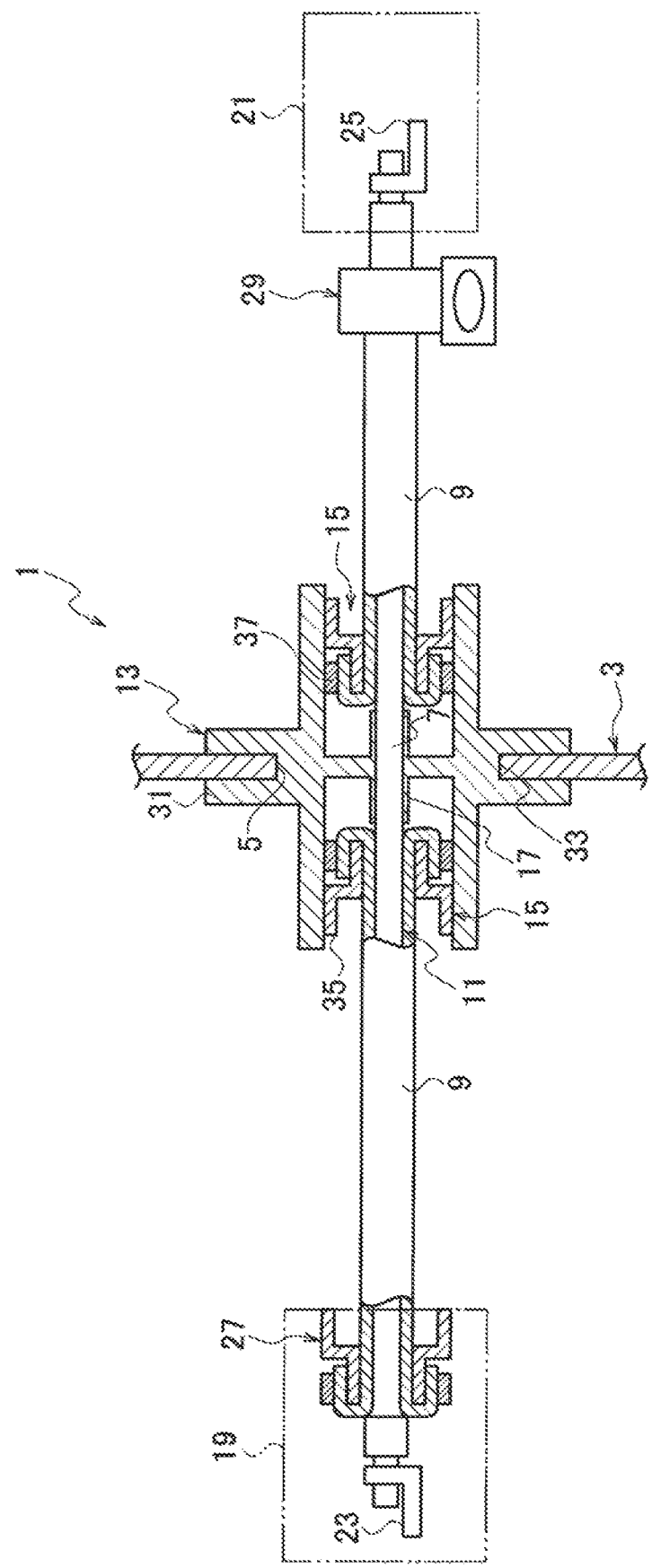
FIG. 1 is a sectional view of a grommet according to an embodiment of the present invention.

A grommet and a grommet assembling method according to an embodiment of the present invention will be described with reference to FIGS. 1 to 3.

A grommet 1 according to this embodiment has: a main body 13, which is arranged in close contact with an opening 5 of an attachment member 3, through which a shield electric wire 11 having an electric wire 7 covered with a braid 9 is inserted, and which includes an elastically deformable electrically conductive material; a pair of shield terminals 15, 15 that are arranged respectively on one side and the other side of the attachment member 3, are connected with end portions of the braid 9, are assembled with the main body 13, and include an electrically conductive material; and an insertion portion 17, which is formed of a member continuous with the main body 13, through which the electric wire 7 exposed from the braid 9 is inserted, and which comes into close contact with the outer circumference of the electric wire 7.

Moreover, a grommet assembling method according to this embodiment has: a first step of inserting the electric wire 7 through the insertion portion 17, which includes an elastically deformable electrically conductive material and is provided at the main body 13, such that the outer circumference of the electric wire comes into close contact with the insertion portion; a second step of connecting end portions of the braid 9 with the pair of shield terminals 15, 15 that are arranged on one side and the other side of the main body 13 and include an electrically conductive material; and a third step of bringing the pair of shield terminals 15, 15 close to the main body 13 such that the braid 9 covers the outer circumference of the electric wire 7 and assembling the pair of shield terminals 15, 15 with the main body 13.

Figure 2:
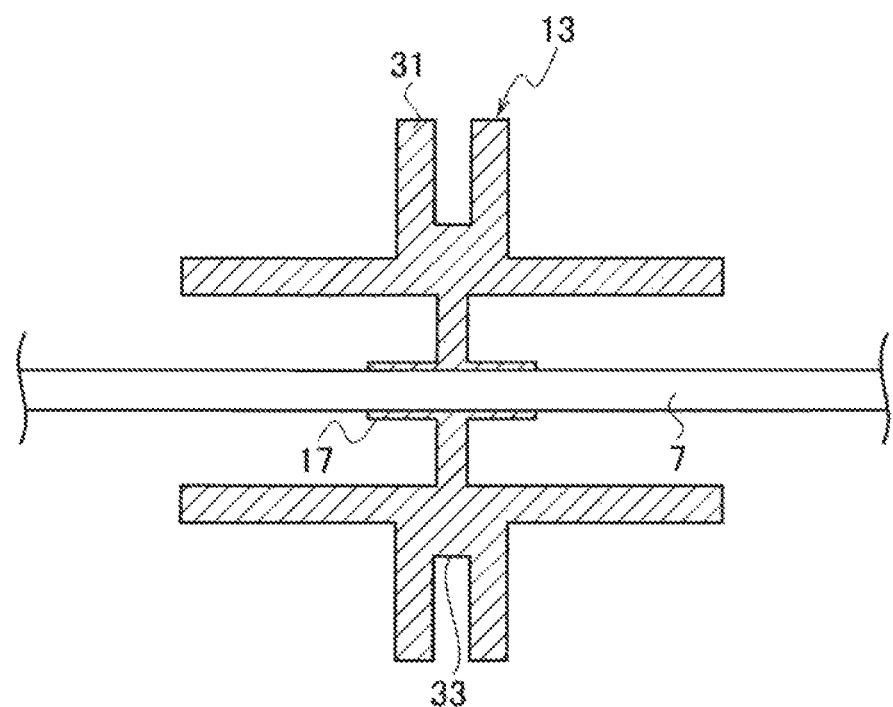
FIG. 2 is a sectional view of when an electric wire of a shield electric wire is inserted through an insertion portion of the grommet according to the embodiment of the present invention.
Figure 3:
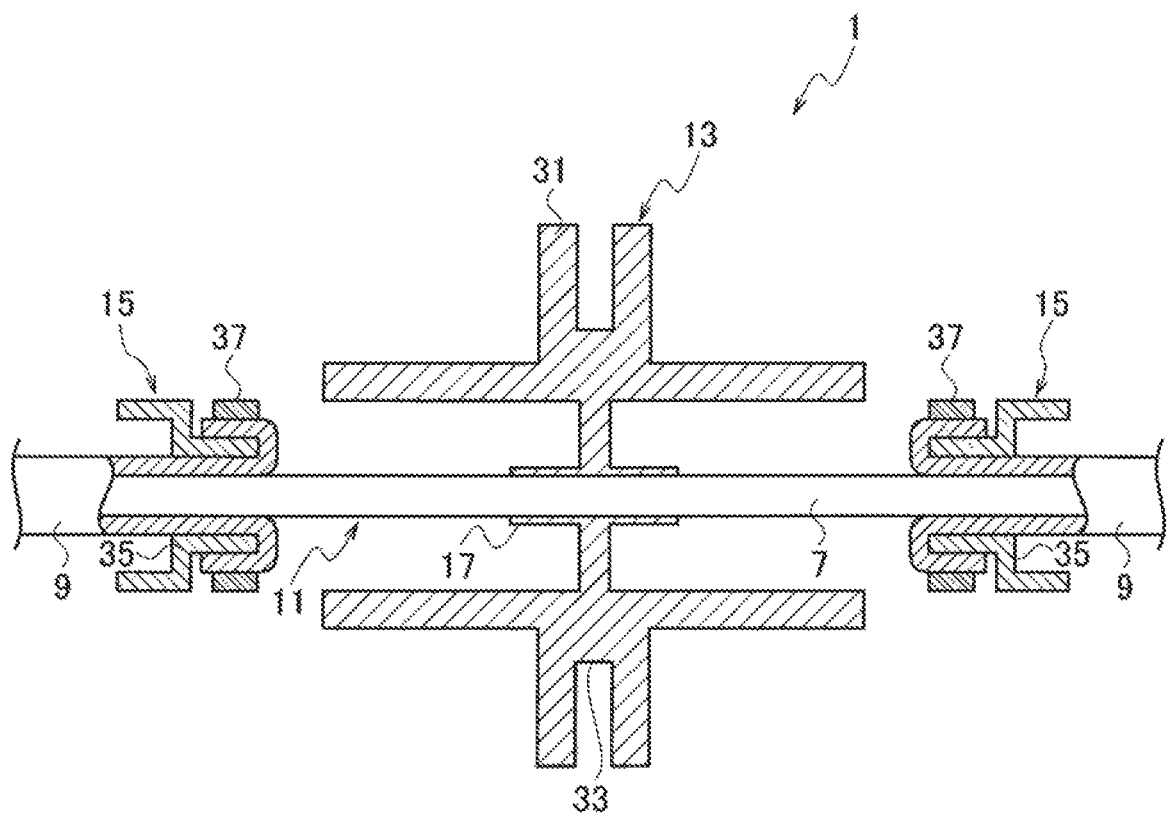
FIG. 3 is a sectional view of when a pair of shield terminals are assembled with a main body of the grommet according to the embodiment of the present invention.

As illustrated in FIGS. 1 to 3, the shield electric wire 11 is provided with a plurality of (two in this case) electric wires 7 and a braid 9.

The plurality of electric wires 7 are constituted of, for example, signal lines, and the terminals 23, 25 housed in connectors 19, 21 are electrically connected with both end portions of the electric wires.

The plurality of electric wires 7 are arranged between apparatuses (not illustrated) or between an apparatus and a power source (not illustrated), and each of the terminals 23, 25 on both end sides is electrically connected with an apparatus, a power source, or the like via fitting of the connectors 19, 21.

The outer circumference of such a plurality of electric wires 7 is covered with the braid 9.

The braid 9 is formed by weaving a plurality of thin electrically conductive materials and covers the outer circumference of the plurality of electric wires 7.

The braid 9 has one end arranged at the connector 19 via a shield terminal 27 and the other end grounded to vehicle body (not illustrated) or the like via a flag terminal 29 and forms a shield circuit.

By covering the outer circumference of the plurality of electric wires 7 with the braid 9 as described above, it is possible to prevent entering of noise or the like into the electric wire 7, or generation of noise or the like from the electric wire 7.

Such a shield electric wire 11 is inserted through the opening 5 provided at the attachment member 3 such as a panel configured to partition a cabin as one side and the outside of the cabin as the other side from each other, for example, and the connectors 19, 21 on both end sides are arranged respectively on one side and the other side of the attachment member 3.

The grommet 1 functioning as a seal member for partitioning one side and the other side from each other is arranged at the opening 5 of the attachment member 3 through which the shield electric wire 11 is inserted.

The grommet 1 is provided with the main body 13, the pair of shield terminals 15, 15, and the insertion portion 17.

The main body 13 includes an electrically conductive material obtained by adding electrically conductive metal such as gold, silver, copper, zinc, iron, or nickel, or an electrically conductive carbon fiber (such as carbon nanotube) to a material such as resin, rubber, or elastomer, and is an elastically deformable member that stretches in an electrified condition in comparison with a nonelectrified condition.

The main body 13 is formed in an annular shape and is provided with a close contact portion 31 having a flange shape over the outer circumference in a circumferential direction, and a groove portion 33 that can be engaged with an edge portion of the opening 5 of the attachment member 3 is formed over the outer circumference of the close contact portion 31 in the circumferential direction.

Close contact fitting of the groove portion 33 of the close contact portion 31 with an edge portion of the opening 5 prevents water or the like from entering through the opening 5 of the attachment member 3.

On the inner circumference of such a main body 13, a pair of shield terminals 15, 15 are assembled on both sides of the shield electric wire 11 in a longitudinal direction.

Each of the pair of shield terminals 15, 15 is provided with a fixed portion 35 that includes an electrically conductive material and formed in a cylindrical shape, and a caulking ring 37 that includes an electrically conductive material and caulked on the outer circumference of the fixed portion 35.

The pair of shield terminals 15, 15 are arranged respectively on one side and the other side of the attachment member 3 in the longitudinal direction of the shield electric wire 11.

The braid 9, 9 of the shield electric wire 11 is inserted respectively through the inner circumference of the fixed portion 35 in such a pair of shield terminals 15, 15, the end portions the braid 9 are arranged by being folded back to the outer circumference of the fixed portion 35, and the end portions of the braid 9 are fixed while being electrically connected with the braid 9 by caulking the caulking ring 37 to the folded end portions of the braid 9.

The pair of shield terminals 15, connected with the braid 9, 9 are brought close to the main body 13 such that the braid 9 covers the outer circumference of the electric wire 7 from both end portions of the shield electric wire 11 in the longitudinal direction, and the fixed portion 35 is fixed to the inner circumference of the main body 13 via fixing means (not illustrated) such as an engaging claw.

By assembling the pair of shield terminals 15, 15 including an electrically conductive material with the main body 13 including an electrically conductive material as described above, the braid 9, 9 divided into one side and the other side of the grommet 1 (attachment member 3) is electrically connected with the main body 13 via the pair of shield terminals 15, 15.

The electric wire 7 of the shield electric wire 11 exposed from the braid 9, 9 connected with such a pair of shield terminals 15, 15 is inserted through the insertion portion 17.

The insertion portion 17 is formed in a cylindrical shape having an inner diameter slightly smaller than an outer diameter of the electric wire 7 such that the insertion portion can come into close contact with the outer circumference of the electric wire 7 with a member continuous with a central portion of the main body 13, and a plurality of (two in this case) insertion portions corresponding to a plurality of electric wires 7 are provided in the main body 13.

Through each insertion portion 17, the electric wire 7 of the shield electric wire 11 is inserted before the pair of shield terminals 15, 15 are assembled with the main body 13, and the insertion portion 17 is arranged in close contact with the outer circumference of the electric wire 7.

By arranging the insertion portion 17 in close contact with the outer circumference of the electric wire 7 of the shield electric wire 11 as described above, no braid 9 having a gap such as a stitch is interposed between the electric wire 7 and the insertion portion 17, and therefore it is possible to reliably retain water cut-off performance between the shield electric wire 11 and the grommet 1.

Therefore, it is unnecessary to use a water cut-off valve in close contact with the electric wire 7, or a water cut-off adhesive member, a filler or the like for filling a gap in the braid 9, and therefore it is possible to reduce the number of parts and also to reduce the number of operation processes for assembling the respective members.

By assembling the pair of shield terminals 15, 15 connected with the braid 9, 9 with the main body 13 in such a state where the electric wire 7 is inserted through the insertion portion 17, the main body 13 and the braid 9 can be electrically connected via the pair of shield terminals 15, 15.

As such an assembling method of the grommet 1, first, a plurality of electric wires 7 of the shield electric wire 11 are inserted through the plurality of insertion portions 17 to be in close contact with the outer circumference of the electric wire 7 (first step) before assembling the pair of shield terminals 15, 15 with the main body 13.

Next, the end portions of the braid 9, 9 of the shield electric wire 11 are respectively assembled with the pair of shield terminals 15, 15, and the pair of shield terminals 15, 15 and the braid 9, 9 are connected (second step).

Then, the pair of shield terminals 15, 15 are respectively brought close to the main body 13 such that the braid 9, 9 covers the outer circumference of the plurality of electric wires 7 from one side and the other side of the main body 13 in the longitudinal direction of the shield electric wire 11, and assembling of the grommet 1 is completed by assembling the pair of shield terminals 15, 15 with the main body 13 (third step).

In such a grommet 1, the pair of shield terminals 15, 15 that are respectively arranged on one side and the other side of the attachment member 3, connected with the end portions of the braid 9, and including an electrically conductive material are assembled with the main body 13, which is arranged in close contact with the opening 5 of the attachment member 3, through which the shield electric wire 11 having the electric wire 7 covered with the braid 9 is inserted, and which includes an elastically deformable electrically conductive material.

Therefore, although the braid 9 of the shield electric wire 11 is divided into one side and the other side of the attachment member 3, the braid becomes electrically connected via the pair of shield terminals 15, 15 and the main body 13 by assembling the pair of shield terminals 15, 15 with the main body 13.

Since the insertion portion 17 formed of a member continuous with the main body 13 is in close contact with the outer circumference of the electric wire 7 exposed from the braid 9 located at the main body 13, it is possible to retain close contact between the electric wire 7 and the insertion portion 17, and therefore it is possible to retain the water cut-off performance between the shield electric wire 11 and the grommet 1.

Accordingly, with such a grommet 1, it is only necessary to assemble the pair of shield terminals 15, 15 connected with the braid 9 with the main body 13 having the insertion portion 17 through which the electric wire 7 is inserted, and it is possible to improve the assemblability.

Moreover, in such a grommet assembling method, since the electric wire 7 is inserted through the insertion portion 17 provided at the main body 13 including an elastically deformable electrically conductive material such that the outer circumference of the electric wire is in close contact with the insertion portion in the first step, it is possible to retain water cut-off performance between the electric wire 7 and the grommet 1.

Moreover, since the pair of shield terminals 15, 15 including an electrically conductive material is assembled with the main body 13 including an electrically conductive material in the third step, the braid 9 can be electrically connected via the pair of shield terminals 15, 15 and the main body 13.

Accordingly, with such a grommet assembling method, it is possible to reduce the number of operation processes, and it is possible to improve the assemblability.

Although the shield electric wire has two electric wires in the grommet according to this embodiment, it is to be noted that the present invention is not limited to this. The shield electric wire may have one electric wire, or three or more electric wires, and an insertion portion corresponding to the number of electric wires may be provided.

What is claimed is:

1. A grommet comprising:
   a main body, which is arranged in close contact with an opening of an attachment member, through which a shield electric wire having an electric wire covered with a braid is inserted, and which includes an elastically deformable electrically conductive material;
   a pair of shield terminals that are arranged respectively on one side and an other side of the attachment member, are connected with end portions of the braid, are assembled with the main body, and include an electrically conductive material; and
   an insertion portion, which is formed of a member continuous with the main body, through which the electric wire exposed from the braid is inserted, and which comes into close contact with an outer circumference of the electric wire.

2. A grommet assembling method comprising:
   inserting an electric wire through an insertion portion, which includes an elastically deformable electrically conductive material and is provided at a main body, such that an outer circumference of the electric wire comes into close contact with the insertion portion;
   connecting end portions of a braid with a pair of shield terminals that are arranged on one side and an other side of the main body and include an electrically conductive material; and
   bringing the pair of shield terminals close to the main body such that the braid covers the outer circumference of the electric wire and assembling the pair of shield terminals with the main body.

3. The grommet according to claim 1, wherein the pair of shield terminals and the main body are separate components.

4. The grommet assembly method according to claim 2, wherein the pair of shield terminals and the main body are separate components.

* * * * *